Figure 1:
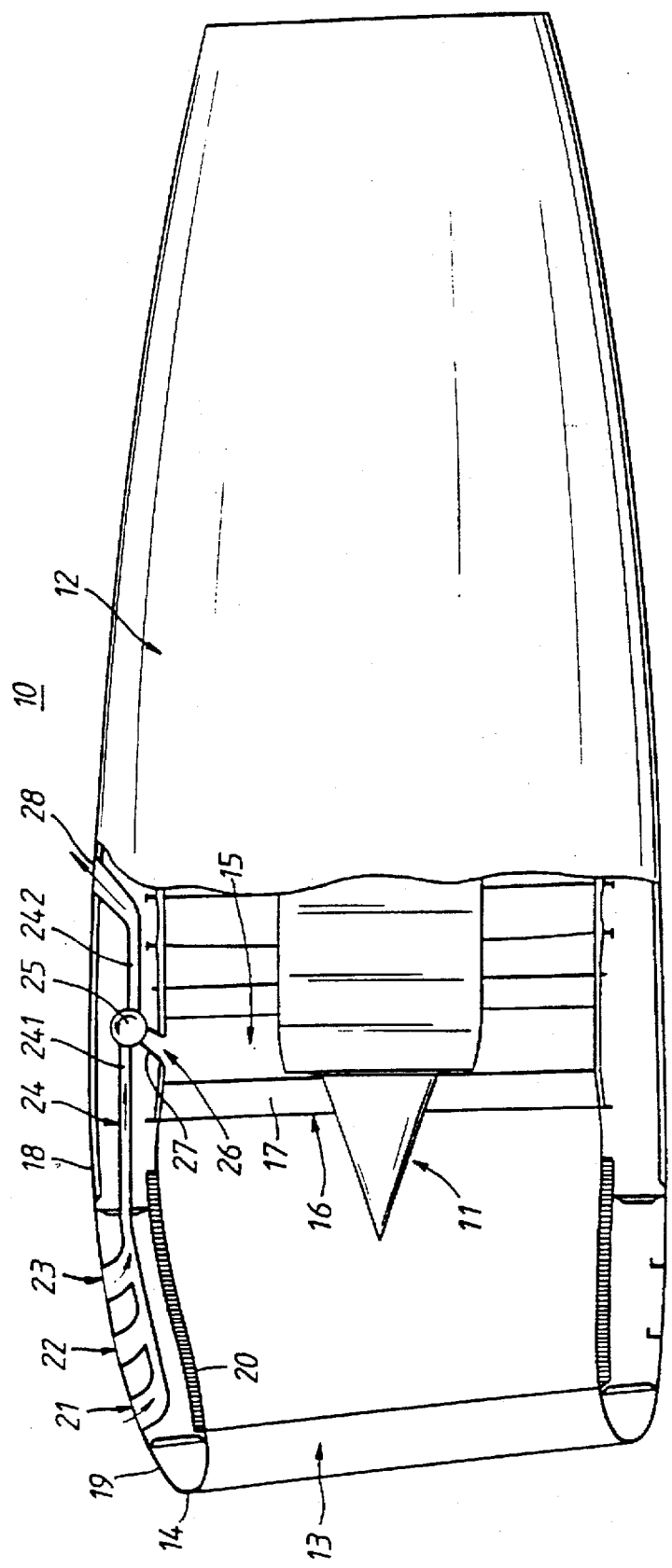

United States Patent
McCaughan

Patent Number: 5,743,493
Date of Patent: Apr. 28, 1998

[54] BOUNDARY LAYER CONTROL IN AERODYNAMIC LOW DRAG STRUCTURES

[75] Inventor: John A. I. McCaughan, Belfast, Northern Ireland

[73] Assignee: Short Brothers PLC, Belfast, Northern Ireland

[21] Appl. No.: 522,284
[22] PCT Filed: Jan. 11, 1995
[86] PCT No.: PCT/GB95/00045
§ 371 Date: Oct. 31, 1995
§ 102(e) Date: Oct. 31, 1995
[87] PCT Pub. No.: WO95/19290
PCT Pub. Date: Jul. 20, 1995

[30] Foreign Application Priority Data

Jan. 13, 1994 [GB] United Kingdom .................. 9400555

[51] Int. Cl.⁶ ..................................................... B64C 1/38
[52] U.S. Cl. ........................... 244/130; 244/130; 244/207; 244/208
[58] Field of Search ............................ 244/207, 208, 244/209, 130, 53 R, 59, 62, 123; 417/406

[56] References Cited

U.S. PATENT DOCUMENTS

| | | | |
|---|---|---|---|
| 2,374,607 | 4/1945 | McCollum | 244/59 |
| 2,433,586 | 12/1947 | Webberking | 417/406 |
| 2,646,945 | 7/1953 | Perry | 244/40 |
| 2,833,492 | 5/1958 | Fowler | 244/40 |
| 4,607,657 | 8/1986 | Hirschkron | 137/15.1 |
| 4,641,799 | 2/1987 | Quast et al. | 244/207 |

FOREIGN PATENT DOCUMENTS

| | | | |
|---|---|---|---|
| 0766668 | 4/1983 | European Pat. Off. | |
| 2474609 | 7/1981 | France | 417/406 |
| 590004 | 3/1928 | Germany | 244/208 |
| 584585 | 9/1933 | Germany | 244/208 |
| 406485 | 3/1934 | United Kingdom | |
| 488942 | 7/1938 | United Kingdom | |
| 576738 | 4/1946 | United Kingdom | |
| 623049 | 5/1949 | United Kingdom | |
| 646132 | 11/1950 | United Kingdom | |
| 1041048 | 9/1966 | United Kingdom | |
| 2232132 | 12/1990 | United Kingdom | |

Primary Examiner—Andres Kashnikow
Assistant Examiner—Tien Dinh
Attorney, Agent, or Firm—Lyon & Lyon LLP

[57] ABSTRACT

An aerodynamic low drag structure (12) has a skin (18, 19, 20) which in movement of the structure (12) relative to a surrounding gaseous fluid medium produces at a flow control region of the skin (18) laminar flow in a boundary layer adjacent the skin. To improve boundary layer control, gaseous fluid is withdrawn from the boundary layer at the flow control region into a first inlet opening (21, 22, 23) in the skin (18) and is conveyed along a first fluid flow path (241, 242) within the structure (12) for discharge at a discharge opening (28) downstream of the first inlet opening (21, 22, 23). Gaseous fluid is withdrawn at a second inlet opening (26) in the skin (20) at a region of the skin subjected to gaseous fluid at ramming pressure and conveyed along a second fluid flow path (27, 242) within the structure to the discharge opening (28) or a further discharge opening. Fluid under ramming pressure in the second fluid flow path (27, 242) causes the fluid in the first fluid flow path (241, 242) to be impelled along the first fluid flow path thereby causing fluid to be withdrawn from the boundary layer and to be discharged from the discharge opening (28).

8 Claims, 2 Drawing Sheets

BOUNDARY LAYER CONTROL IN AERODYNAMIC LOW DRAG STRUCTURES

The present invention relates to boundary layer control in aerodynamic low drag structures and is particularly although not exclusively concerned with the control of laminar flow of air in a boundary layer adjacent an outer skin surface of an aero-engine nacelle.

It is well known to provide control over a boundary layer adjacent an aerodynamic surface exposed to air flow over it by injecting air into the boundary layer or by withdrawing air from it. In boundary layer control by injection of air, high speed air is blown into the boundary layer to prevent or control separation, that is to say, detachment of the flow from the aerodynamic surface with which it has been in contact. In boundary layer control by withdrawal of air from the boundary layer, separation is prevented or controlled by removing the layer which would otherwise separate. In addition to preventing or controlling separation, withdrawal of air has also been used to prevent or control boundary layer transition, that is to say, the change from laminar to turbulent flow in the boundary layer and is of particular interest in maintaining laminar flow over surfaces of structures required to have low drag characteristics.

Aero-engine nacelles are routinely designed to provide outer skin profiles having low drag characteristics. It has been found that the aerodynamic efficiency of the nacelle is seriously impaired by transitions from laminar flow to turbulent flow in the boundary layer adjacent the outer skin. The maintenance of laminar flow significantly improves the specific fuel consumption (SFC) of the engine and in consequence efforts are constantly being made to produce and sustain laminar flow.

It has been proposed to encourage laminar flow over a nacelle outer skin by withdrawing air through the nacelle skin by the use of suction pumps and exhausting the withdrawn air into turbulent air flow downstream of the nacelle. Such proposals have however made use of electrical power, bleed air from the engine compressor or ejectors which also make use of engine compressor bleed air. There is however the disadvantage that while the specific fuel consumption (SFC) of the engine is improved by the introduction and maintenance of laminar flow the energy employed to drive the suction pumps and to create the laminar flow has the opposite effect and reduces the specific fuel consumption of the engine.

It is an object of the present invention to provide a means by which laminar airflow over a nacelle outer skin can be improved by withdrawing air through the nacelle skin but which does not suffer or does not suffer to the same extent from the above-mentioned disadvantage.

According to a first aspect of the present invention, there is provided an aerodynamic low drag structure which has a skin and which in movement of the structure relative to a surrounding gaseous fluid medium produces at a flow control region of the skin laminar flow of the gaseous fluid in a boundary layer adjacent the skin, characterised by the provision of a first inlet opening in the skin in the flow control region, first gaseous fluid conveying means within the structure by which fluid withdrawn from the boundary layer into the first inlet opening is conveyed along a first fluid flow path within the structure for discharge from the structure at a discharge opening downstream of the first inlet opening, a second inlet opening in the skin of the structure in a gaseous fluid ram region of the skin in which the skin is subjected to gaseous fluid of the surrounding medium at a predetermined ramming pressure, second gaseous fluid conveying means within the structure in which gaseous fluid under ramming pressure is conveyed from the second inlet opening in the skin along a second fluid flow path within the structure to the discharge opening or a further discharge opening and impelling means so positioned and arranged that the flow of fluid under ramming pressure in the second fluid flow path causes the fluid in the first fluid flow path to be impelled along the first fluid flow path from the first inlet opening to the discharge opening thereby to cause fluid to be withdrawn from the boundary layer in the flow control region and to be discharged from the discharge opening.

In an embodiment of the invention hereinafter to be described the impelling means is so positioned and arranged that the gaseous fluid conveyed under ramming pressure in the second fluid flow path from the second inlet opening imparts drive to the impelling means and the impelling means is responsive to the drive imparted thereto to impel the fluid in the first gaseous flow path.

In an embodiment of the invention hereinafter to be described the impelling means comprises a rotor with impeller blades which operate in the first fluid flow path to impel the fluid therein from the first inlet opening to the discharge opening and the rotor is arranged to be rotatably driven by fluid flowing in the second fluid flow path. The impeller blades of the rotor may then operate in the second fluid flow path so as to be rotatably driven by gaseous fluid under raging pressure flowing therein. Alternatively, the rotor is provided with further blades which operate in the second fluid flow path so as to be rotatably driven by gaseous fluid under ramming pressure therein.

According to a second aspect of the present invention there is provided an aero engine nacelle having a low drag structure according to the first aspect of the invention, wherein the structure includes a nacelle skin having an outer skin portion which produces at a flow control region thereof laminar flow of air in a boundary layer adjacent the outer skin portion and an inner skin portion which defines an air intake duct for the flow of intake air, wherein the first inlet opening is provided in the outer skin portion at the flow control region thereof and wherein the second inlet opening is provided in a ram air region of the nacelle skin.

According to a third aspect of the invention there is provided an aircraft propulsive power unit including a nacelle according to the second aspect of the invention and an aero-engine to which intake air is supplied through the air intake duct.

In an embodiment of the invention hereinafter to be described, the second inlet opening is provided at a ram-air region of the inner skin portion.

According to a fourth aspect of the invention there is provided a ducted fan turbine unit according to the third aspect of the invention wherein a fan is located in the air intake duct for the supply of by-pass air under pressure to a by-pass fan duct formed in part by the inner skin portion of the nacelle skin and wherein the second inlet opening is provided in the inner skin portion at a ram-air region of the by-pass fan duct downstream of the fan.

Figure 2:
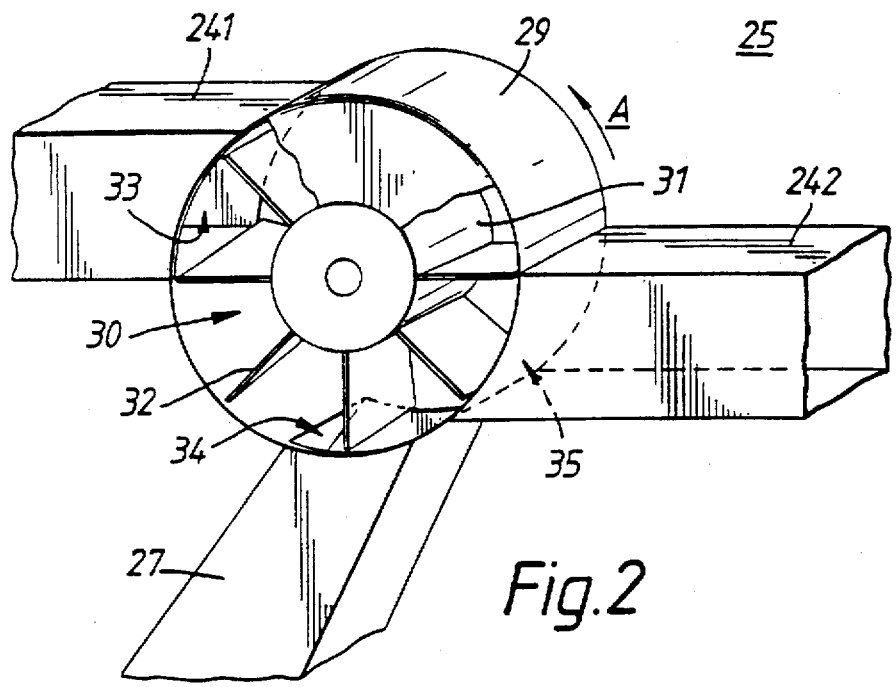
Figure 3:
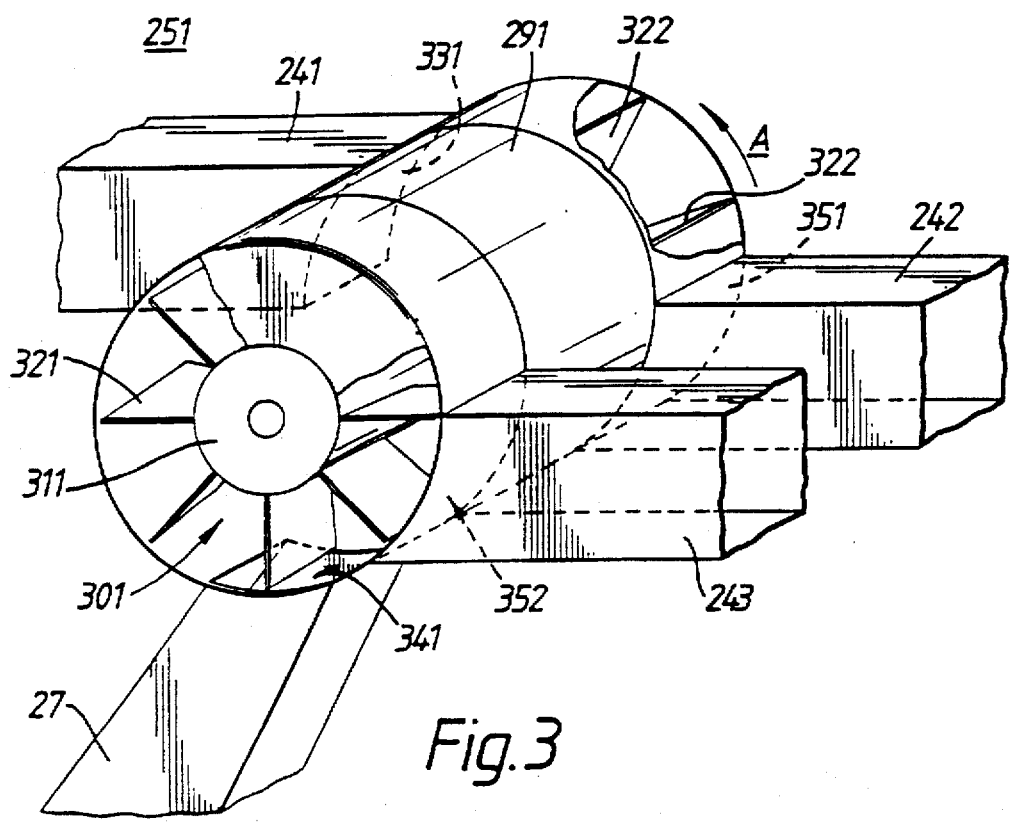

Embodiments of the invention will now be described by way of example with reference to the accompanying drawings in which:

FIG. 1 is a schematic part sectional side elevation of a ducted fan aero engine propulsive power unit according to a first embodiment of the invention, FIG. 2 is a schematic isometric view of impelling means according to the first embodiment of the invention, FIG. 3 is a schematic isometric view of impelling means according to a second embodiment of the invention.

Referring to FIG. 1 of the drawings, a propulsive power unit 10 is shown which comprises a core engine 11 housed within an engine nacelle 12. The core engine 11 is a gas turbine engine of a form well known in the art and includes a fuel supply section, a combustion section including a combustion chamber, an exhaust section terminating in an propulsion nozzle and a compressor section for supplying air under pressure to the combustion chamber. The compressor section of the core engine 11 is supplied with air through an air intake opening 13 formed by an annular nose portion 14 of the nacelle 12.

The power unit 10 is a ducted fan turbine power unit in which a proportion of the air passing through the intake opening 13 is diverted into an annular fan duct 15 defined by an outer surface of the core engine 11 and an inner surface of the nacelle 12. The diverted air which passes through the annular duct 15 by-passes the compressor, combustion and exhaust sections of the core engine 11 and is discharged from the rear of the nacelle together with the efflux from the propulsion nozzle of the core engine 11. Part of the net energy developed by the core engine 11 is employed to drive a fan 16 having radial blades 17 which produce a propulsive force on the unit 10 by impelling intake air through the fan duct 15.

The nacelle 12 is of a configuration well known in the art and comprises a forward outer skin portion 18 which terminates at its foremost extent in a lipskin 19 which forms the annular nose portion 14 of the nacelle and an inner skin portion 20 which extends rearwardly from the lipskin 19 to form the outer wall of the fan duct 15.

Toward the front of the outer skin portion 18, there are provided a plurality of suction slots 21, 22 and 23 which extend circumferentially over a predetermined arc of nacelle 12 and which communicate with a common conveying duct 24 having forward and rearward duct portions 241 and 242 through which air is impelled under the action of a rotary suction pump 25. The pump 25 hereinafter to be described includes a rotor with impeller blades which operate in the conveying duct 24 to impel air therein from the suction slots 21 to 23 to a discharge opening 28 in the nacelle skin downstream of the slots 21, 22 and 23.

At a region of the inner skin 20 of the nacelle 12 downstream of the fan 16 there is formed an inlet opening 26 which leads to a ram-air duct 27 which supplies fan air to the pump 25 which as hereinafter to be described is rotatably driven by the fan air which then discharges into the conveying duct portion 242 downstream of the pump 25.

Referring now to FIG. 2 the rotary pump 25 described with reference to FIG. 1 comprises a cylindrical casing 29 within which is co-axially mounted a rotor 30 formed by a hub 31 and a plurality of radially extending impeller blades 32. The casing 29 is provided with two inlet openings 33 and 34 which provide fluid flow communication with the duct portion 241 and fluid flow communication with the ram-air duct 27 and an outlet opening 35 which provides fluid flow communication with the duct portion 242 of the conveying duct 24.

The fan air supplied by the ram-air duct 27 to the pump 25 is at an elevated pressure developed by the action of the fan 16 and is, as shown, arranged to impinge as ram air on the impeller blades 32 of the pump rotor 30 causing the rotor 30 to rotate in the direction of the arrow A. Rotation of the rotor 30 then causes the impeller blades 32 to withdraw air through the suction slots 21 to 23 and convey it along duct portions 241 and 242 of the conveying duct 24 for discharge at the discharge opening 28.

In an alternative embodiment of the invention described with reference to FIG. 3, the rotary pump 25 is replaced by a rotary pump 251 which comprises a casing 291 housing a rotor 301 having a hub 311 upon which are mounted two sets of impeller blades 321 and 322. Openings 331 and 351 in the casing 291 provide fluid communication with the duct portions 241 and 242 while further openings 341 and 352 provide fluid communication with the ram-air duct 27 and a discharge duct 243.

In the operation of the pump 251 shown in FIG. 3, the fan air supplied by the ram-air duct 27 is arranged to impinge as ram air on the impeller blades 321 of the pump rotor 301 causing the rotor 301 to rotate in the direction of the arrow A. Rotation of the rotor 301 then causes the impeller blades 322 to withdraw air through the suction slots 21 to 23 and convey it along the duct portions 241 and 242 of the conveying duct 24 for discharge at the discharge opening 28.

The fan air applied to the impeller blades 321 from the ram-air duct 27 discharges from the pump casing along the discharge duct 243 which can be arranged to merge with the duct portion 242 for discharge of the fan air at the discharge opening 28. Alternatively, the discharge duct 243 can be arranged to terminate at a further discharge opening located either elsewhere in the outer skin 18 of the nacelle or in the inner skin 20 of the nacelle 12 at a low pressure region downstream of the ram-air duct 27.

The by-pass fan air in the fan duct 15 is advantageously arranged to drive the suction pump 25 or 251 via an air inlet opening in the fan cowl of the nacelle.

While only one assembly of suction slots, rotary suction pump and conveying and ram-air ducts has been described with reference to FIG. 1 of the drawings it will be appreciated that a plurality of such assemblies can be provided in spaced relation about the circumference of the nacelle. Furthermore, a plurality of pumps may be provided in spaced relation about the circumference of the nacelle with conveying and ram-air ducts for use with one or more suction slots or one or more assemblies of slots.

It is furthermore to be understood that while the disposition of the inlet opening 26 for the duct 27 has been chosen downstream of the fan 16, the pump 25 could be driven by ram air provided at an inlet opening in the nacelle outer skin 18 or in the inner skin 20 upstream of the fan 16 provided the ram air pressure is sufficient to operate the pump 25.

I claim:

1. An aerodynamic low drag structure which has a skin and which in movement of the structure relative to a surrounding gaseous fluid medium produces at a flow control region of the skin laminar flow of the gaseous fluid in a boundary layer adjacent the skin, characterised by the provision of a first inlet opening in the skin in the flow control region, first gaseous fluid conveying means within the structure by which fluid withdrawn from the boundary layer into the first inlet opening is conveyed along a first fluid flow path within the structure for discharge from the structure at a discharge opening downstream of the first inlet opening, a second inlet opening in the skin of the structure in a gaseous fluid ram region of the skin in which the skin is subjected to gaseous fluid of the surrounding medium at a predetermined ramming pressure, second gaseous fluid conveying means within the structure in which gaseous fluid under ramming pressure is conveyed from the second inlet opening in the skin along a second fluid flow path within the structure to the discharge opening or a further discharge opening and impelling means so positioned and arranged that the flow of fluid under ramming pressure in the second fluid flow path causes the fluid in the first fluid flow path to be impelled along the first fluid flow path from the first inlet opening to the discharge opening thereby to cause fluid to be withdrawn from the boundary layer in the flow control region and to be discharged from the discharge opening;

an aero engine nacelle, the skin defining a nacelle skin having an outer skin portion which produces at the flow control region thereof laminar flow of air in a boundary layer adjacent the outer skin portion and an inner skin portion which defines an air intake duct for the flow to intake air, wherein the first inlet opening is provided in the outer skin portion at the flow control region thereof.

2. A structure according to claim 1 wherein the impelling means is so positioned and arranged that the gaseous fluid conveyed under ramming pressure in the second fluid flow path from the second inlet opening imparts drive to the impelling means and wherein the impelling means is responsive to the drive imparted thereto to impel the fluid in the first gaseous flow path.

3. A structure according to claim 2, wherein the impelling means comprises a rotor with impeller blades which operate in the first fluid flow path to impel the fluid therein from the first inlet opening to the discharge opening and wherein the rotor is arranged to be rotatably driven by fluid flowing in the second fluid flow path.

4. A structure according to claim 3, wherein the impeller blades of the rotor operate in the second fluid flow path so as to be rotatably driven by gaseous fluid under ramming pressure flowing therein.

5. A structure according to claim 3, wherein the rotor is provided with further blades which operate in the second fluid flow path so as to be rotatably driven by gaseous fluid under ramming pressure therein.

6. The structure according to claim 1 further characterized by a propulsive power unit for an aircraft having a aeroengine to which intake air is supplied through the air intake duct.

7. The structure according to claim 6, wherein the second inlet opening is provided at a ram-air region of the inner skin portion.

8. The structure according to claim 7 further characterized by a compressor located in the air intake duct for compressing intake air for the supply of intake air under pressure to the engine and to a by-pass duct formed in part by the inner skin portion of the nacelle skin and wherein the second inlet opening is provided in the inner skin portion at a ram-air region of the by-pass duct.

\* \* \* \* \*